United States Patent [19]

Abrahamsson et al.

[11] Patent Number: 5,297,285

[45] Date of Patent: Mar. 22, 1994

[54] SYSTEM FOR DYNAMICALLY LINKING MODULAR PORTIONS OF COMPUTER SOFTWARE

[75] Inventors: Anders Abrahamsson, Stockholm; Lars Holmqvist, Haninge, both of Sweden

[73] Assignee: Telefonaktiebolaget L M Ericsson, Stockholm, Sweden

[21] Appl. No.: 734,456

[22] Filed: Jul. 23, 1991

[51] Int. Cl.$^5$ .............................................. G06F 13/00
[52] U.S. Cl. .............................. 395/700; 364/DIG. 1; 364/284; 364/284.3
[58] Field of Search ................. 395/700; 364/DIG. 1, 364/284, 284.3

[56] References Cited

U.S. PATENT DOCUMENTS

| | | |
|---|---|---|
| 3,969,701 | 7/1976 | Hemdal . |
| 4,037,215 | 7/1977 | Birney et al. . |
| 4,074,072 | 2/1978 | Christensen . |
| 4,138,738 | 2/1979 | Drogichen . |
| 4,385,352 | 5/1983 | Bienvenu . |
| 4,425,618 | 1/1984 | Bishop et al. . |
| 4,731,817 | 3/1988 | Jonsson et al. . |
| 4,791,558 | 12/1988 | Chaitin et al. . |
| 4,833,604 | 5/1989 | Cheng et al. . |
| 4,849,877 | 7/1989 | Bishop et al. . |
| 4,853,842 | 8/1989 | Thatte et al. . |
| 4,873,521 | 10/1989 | Dietrich et al. . |
| 4,922,415 | 5/1990 | Hemdal ............................. 364/200 |
| 4,961,141 | 10/1990 | Hopkins et al. . |
| 4,980,844 | 12/1990 | Demjanenko et al. ............. 364/550 |
| 5,006,976 | 4/1991 | Jundt ................................. 364/184 |
| 5,073,852 | 12/1991 | Siegel et al. ...................... 395/700 |

OTHER PUBLICATIONS

Presser & White, "Linkers and Loaders," Computing Surveys, vol. 4, No. 3, Sep., 1972, 149–167.

Primary Examiner—Gareth D. Shaw
Assistant Examiner—A. Katbab
Attorney, Agent, or Firm—Johnson & Gibbs

[57] ABSTRACT

A method for dynamically modifying addressing information within a modular software system controlling a telecommunications switching system. Conventional telecommunications exchanges divide each exchange into discrete function blocks with a limited number of functions being performed by each block, thus requiring frequent interaction between blocks through the exchange of software signals. Such exchanges are more complicated in stored program control systems in which individual blocks are removed from memory and reloaded in different memory locations and in which revised blocks contain modified symbol addresses. The present invention utilizes a global signal distribution table loaded with global signal numbers for types of software signals, as well as local signal numbers of corresponding tasks given function blocks. This method overcomes disadvantages typically associated with linking and loading of software modules by delaying linking and performing it dynamically as each block is executed. This method reads a global signal number from a sending block, inserts this global signal number into a job buffer and reads the global signal number and receiving block number of the signal to be sent from the job buffer and the local signal number from the global signal distribution table. Finally, the instruction address is read from the signal distribution table of the receiving block and the instruction located at that address executes. Because local addresses are dynamically stored and read only when a module utilizing those addresses is executed, the information remains current and accurate at all times during operation of the telecommunications switching system.

15 Claims, 4 Drawing Sheets

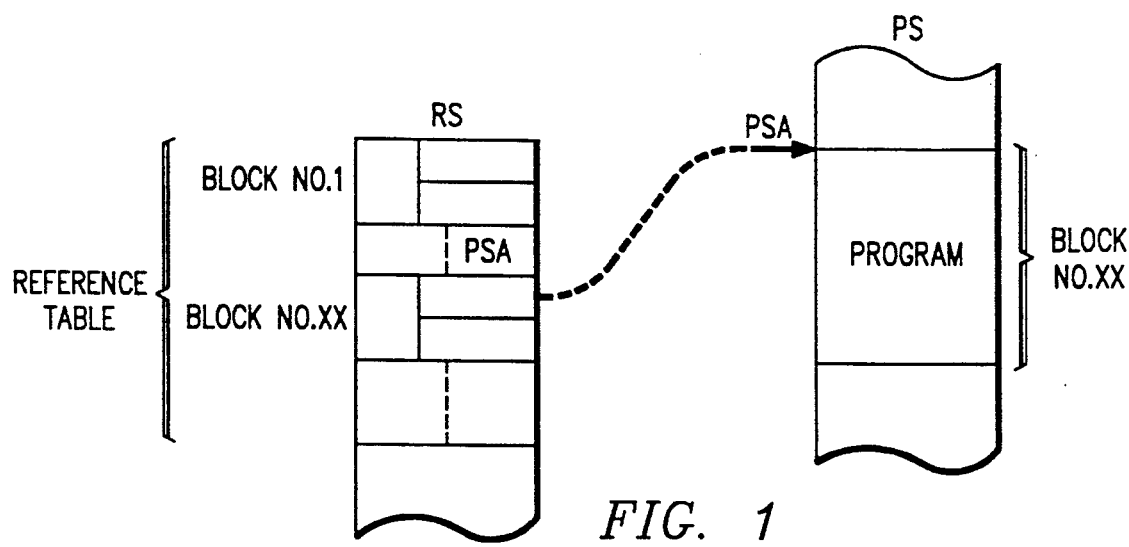
FIG. 1
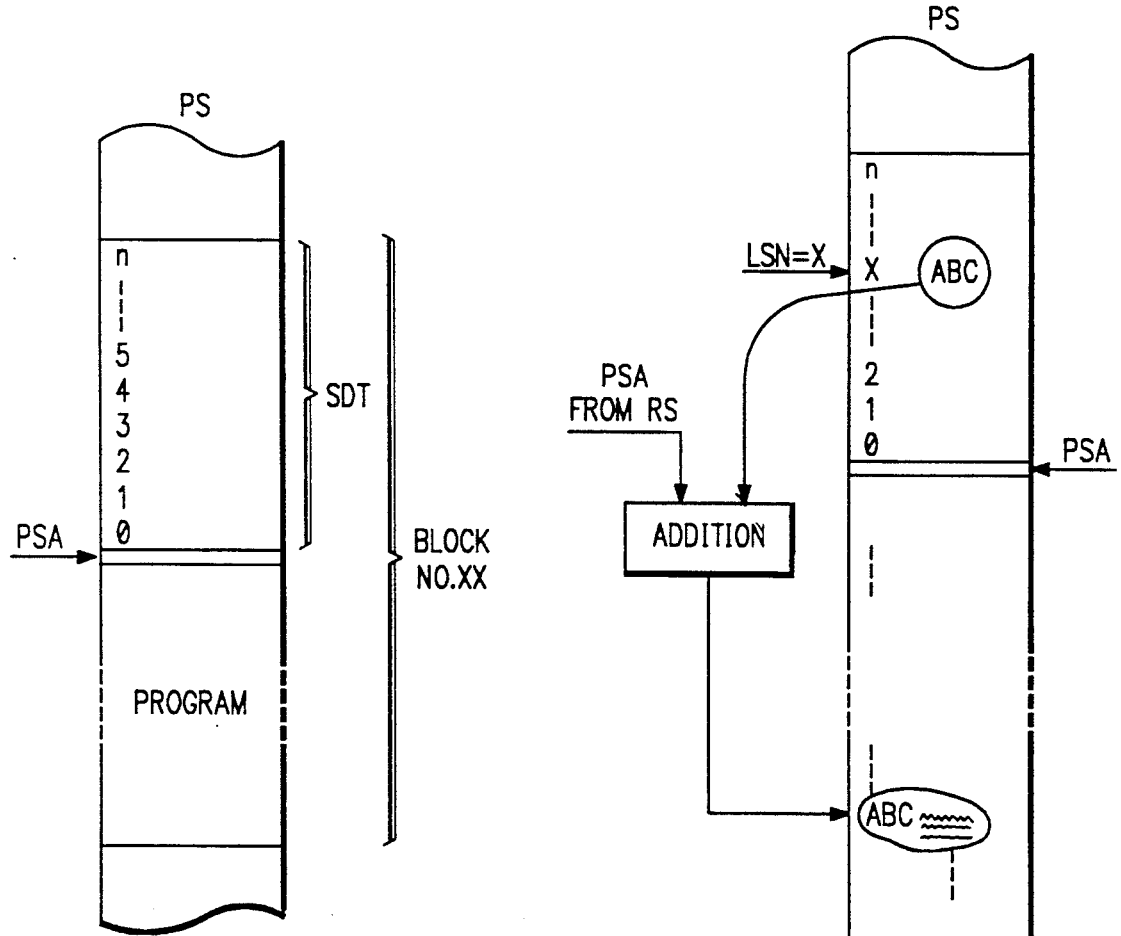
FIG. 2
FIG. 3

SYSTEM FOR DYNAMICALLY LINKING MODULAR PORTIONS OF COMPUTER SOFTWARE

BACKGROUND OF THE INVENTION

1. Field of the Invention

A portion of the disclosure of this patent document contains material which is subject to copyright protection. The copyright owner has no objection to the facsimile reproduction by anyone of the patent document or the patent disclosure, as it appears in the patent and trademark office, patent file or records, but otherwise reserves all copyrights whatsoever.

The invention relates to software and the control of a telecommunications switching system. More particularly, it relates to a method for dynamic modification of addressing information within such a system.

2. Description of Related Art

Contemporary telecommunications switching systems employing stored program control operation generally utilize one or more computers to control the various functions within the system. In the organization of such conventional stored program control telecommunications exchanges, it is known to divide up each exchange into individual function blocks so that a limited number of functions are performed by each block. Therefore, the interworking between different blocks requires the simplest possible interfaces with as few signalling circuits as possible. Dividing the software for controlling such exchanges into discrete function blocks results in frequent interaction between those blocks through the exchange of software signals controlling the flow of both instructions and data within the system. A function block oriented stored program control telecommunications exchange is disclosed in Hundal U.S. Pat. No. 3,969,701.

In general, the problems associated with the linking and loading of discrete software modules into computer systems is also present in stored program control telecommunication exchanges. Among these problem are those associated with storing of the program modules in main memory, referred to as loading, and the combining of sub-program modules into a composite program, referred to as linking. The general principle associated with these issues are discussed in an article entitled "Linkers and Loaders," Leon Presser and John White, *Computing Surveys*, Vol. 4, September 1972.

The basic concept involves the requirement that interlinking program modules must contain accurate addresses within them in order to access other parts of related program modules necessary for proper operation. When a particular program module is removed from memory and later reloaded, it may be placed in a different memory loc tion than it occupied during its previous residence. Therefore, prior to loading the module, there must be some mechanism for providing a reference to the specific instructions within the program so that those instructions can be located by the other modules of the program.

In addition, program modules forming part of the operating program of the telecommunication exchange are frequently modified or enhanced to provide additional functions or efficiencies, thus modifying the interactions with other program modules. In modifying program modules, it is usually necessary to add and delete portions of the instructions within that module in order to accomplish the objective of the modification. These actions require that the addresses within the specific modules and the individual modified components thereof, be properly accounted for when they are reloaded into the system for execution.

The process of storing translated or compiled programs into the main memory of a computer for execution is generally known as loading. The loading of program instructions into the main memory from other, secondary memory sources or locations is a necessary prerequisite to execution of the software. Problems have resulted because of the fact that some programs are too large to be fully loaded into the main memory and, therefore, require portions of the program to be swapped in and out of memory during execution. Problems have also resulted from the fact that programs are not always loaded back into the precise absolute address space each time they are executed; therefore, the addresses for symbols within a particular program module or block must be recalculated each time the block is executed.

A related concept is known as linking. Linking involves the combination of subprograms into a composite program and has been accepted as a valuable tool in modern operating systems in which modular software plays a vital part. Linking can, in theory, be accomplished at any one of seven different times: at source code generation time; after code generation but before compilation or translation; at compilation or translation time, after translation but before loading; at loading; after loading but before execution; or at execution. Widely-known systems such as the IBM System/360 and the UNIVAC 9400 perform linking after translation but before loading. Many existing systems also perform linking, at load time, but performing the operations in conjunction with one another limits the flexibility available when the two operations are performed separately. Although the possibility of linking at execution time has been recognized, this approach, known as segmentation, has been believed to have numerous problems associated with it such as higher overhead costs and the need for the hardware and software to be highly integrated.

One way of handling the management of addressing information within the components of modular software is by providing a global signal distribution table which is loaded with the global signal numbers associated with certain types of signals within the software along with the local signal numbers of corresponding jobs within the particular module being loaded into the software. This enables each global signal number or external reference to call for a global signal number to be cross-referenced in the global signal number distribution table to locate the local signal number within a particular software block prior to loading that signal into a job buffer of the processor for transfer to another block of the software.

While such a technique of linking processes within and among individual software blocks and interlinking addresses within the various software modules of a program is effective, it includes certain inherent disadvantages. One of these disadvantages is that after a revised block is re-loaded into the system, the processing of signals placed in the job buffer before the modification of the software block can no longer be accurately performed because the local signal numbers associated with the modified block may have been changed when the block was reloaded and the global signal distribution table rewritten. Therefore, whenever a module of a program has been modified and must be reloaded, all information within the job buffer must be purged and then reloaded. In addition, when the contents of the global signal distribution table have been changed due to unloading and reloading of a modified software block, it can lead to the inadvertent use of an old local signal number in the job buffer which results in the execution of an incorrect instruction address if another signal has been allocated to this local signal number in the new version of the reloaded block or module. Further, the software user will receive no error notification when this occurs because the software is unable to recognize that the instruction address is incorrect. This can result in corrupted output if the block is able to be executed fully.

The method and system of the present invention overcomes these and other disadvantages and provides an enhanced level of speed and reliability within modular software systems by dynamically linking addresses within the software as the individual software modules are executed.

SUMMARY OF THE INVENTION

In one aspect, the invention relates to the binding of addresses of individual software modules at the time of execution of those software modules within the computer system's central processor. In carrying out the principles of the present invention, in accordance with a preferred embodiment thereof, a modular software system such as one that might be used in a telecommunications switching system is designed to delay the binding of variables and signals within the software until the time, during execution, when a given module is actually executed. This approach overcomes prior problems in modular systems that did not allow modifications to be made to individual software modules without requiring the entire set of software modules within the software system to be relinked before execution.

It also overcomes the problems associated with the existence of limited memory space in the computer system's main memory which in many cases is too small to contain the entire set of software. In such a situation, software modules must be swapped in and out of memory with no guarantee that the software module will be bound to the same physical address space in subsequent executions or loads. This can result in incorrect referencing of local addresses within a module.

One aspect of a preferred embodiment of the present invention involves transferring software signals from one module of a modular software system to another module of the software system by referencing a local signal number for each signal or operation or job occurring within a given module. Such local signal numbers may be referenced in a global signal distribution table which provides a cross reference between global signal or job numbers and local numbers, internal to each module. The local signal numbers and their associated block numbers are stored or updated in the global signal distribution table at the time when the module is loaded or executed, thereby avoiding the problems noted above.

An aspect of the method of the present invention involves identifying witch software signal is to be transferred from one module to another and transferring a global signal number associated with that software signal and a block number associated with the module to receive the software signal to a register within the system's job buffer, contained in the central processing unit. Once the information is within the job buffer, it has an assigned priority and will be executed in turn, in accordance with that priority. When the signal reaches the top of the job buffer queue and is then executed, the global signal distribution table is accessed in order to obtain the associated local signal number in the receiving module or block. This is achieved by combining the global signal number with the number associated with the receiving block. Finally, the local signal number points to an instruction address in the receiving block which in turn points to an instruction within the receiving block which is to be executed.

Although this method of addressing and communication may at first sight appear to be rather complicated, it has several important advantages. It allows a program to be stored anywhere within the system's program store without affecting anything except the value stored in the reference store as the program start address for that module. Further, a program sequence or job may be placed anywhere within a block of software without affecting anything except the address in the signal distribution table. All of these advantages make the software system easier to use and less prone to instruction errors which are often not detectable by the human user.

According to another aspect of the present invention, in the process of transferring signals between software modules or blocks, data and parameters associated with the software signal or job is also accessed and passed on to the receiving block along with the software signal for execution. This is accomplished by referencing the base start address that is associated with the sending block and stored in the system's reference store. This base start address then allows access to the portion of the data store in which the data associated with the software signal is stored. This type of referencing scheme, therefore, allows the number of variable per block to be completely flexible because only the size of the base address table is affected.

BRIEF DESCRIPTION OF THE DRAWINGS

For a more detailed understanding of the present invention ana for further objects and advantages thereof, reference can now be had to the following description taken in conjunction with the accompanying drawings, in which:

FIG. 1 is a diagrammatic representation of the manner in which addressing information for modular software blocks in a computer program is stored in a reference memory;

FIG. 2 is a diagrammatic representation of the manner in which program instructions and associated addressing information within modular software blocks of a computer program are stored;

FIG. 3 is a diagrammatic representation of the manner in which individual jobs are addressed within modular software blocks;

DETAILED DESCRIPTION

Figure 4:
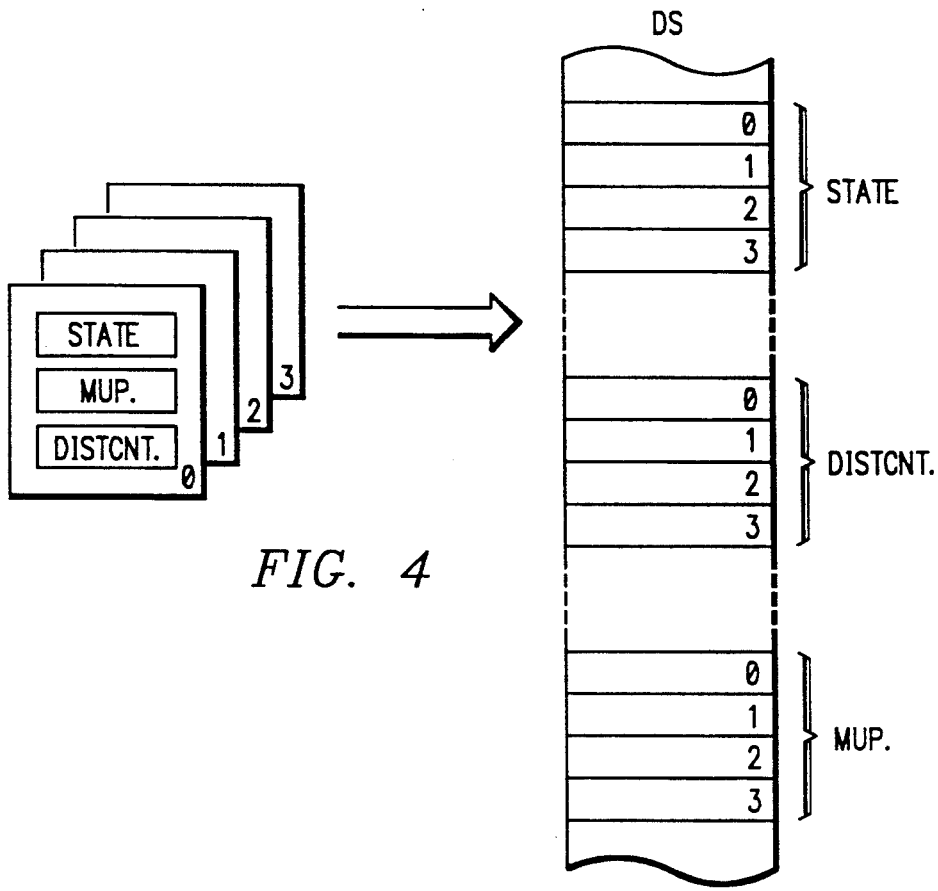
FIG. 4 is a diagrammatic representation of the manner in which data associated with modular software blocks is stored in a data storage-memory.

The control of a telecommunication exchange may be organized in a number of different ways. When the system is divided into various function blocks, however, the interworking between the various blocks takes place through the central processor of the system. In order to facilitate the location and identification of the various function blocks within the software, each block is generally given a unique number. A typical exchange generally contains between 300 and 500 function blocks.

The overall system typically contains a plurality of different memory areas in which different aspects of the software control system are stored. Referring to FIG. 1, there is shown two such areas comprising a program store (PS) which contains the code comprising the operational instructions or steps of the software arranged by block number. Similarly, a different area, known as the reference store (RS), is used to store certain addressing parameters used in accessing the program store. For example, in FIG. 1, the portion of the program comprising block XX in the program store begins at a program start address (PSA) in the program store and that PSA is written as a discrete word associated with block XX in the reference store. That is, the program's start address indicates the address at which the block begins in the program store and the block number (BN) is used for addressing that word in the reference store. Thus, each block in the system has an area of its own in the reference store comprising a table referred to as the reference table.

A function block can usually perform a large number of tasks or "jobs," and each job is initiated by sending a signal to the appropriate block. In order to facilitate locating a desired job within a particular block, each signal is given an individual number, referred to as the signal location and local signal number (LSN). To initiate a job within a particular block requires both a block number and a local signal number, which two elements together form what is referred to as a software signal, normally abbreviated as BN+LSN.

Referring next to FIG. 2, there is diagrammatically shown a portion of the program within the program store which includes, as part of block XX, both the program information as well as a signal distribution table (SDT). A discrete address is written into each position of the signal distribution table. This address, which is always relative to the program start address of the block, indicates where within the program the different jobs begin. As a result, the absolute address of a job comprises the starting address of the block (PSA) plus the address given in the signal distribution table. Referring to FIG. 3, we see an illustration of the addressing of a specific job within the program by combining the address of the beginning of the block containing the desired job with the address given in the signal distribution table corresponding to the local signal number of the job to reach the specific address within the block containing the software to perform that job.

In order to perform a particular job, the software within a block must be able to address data. In systems of the type presently being described, a block can address only its "own" data, i.e., data to which it is selectively allowed access. In order to illustrate the way in which data related to the operation of a program control telecommunications switching system of the present type is stored within another area of memory, referred to as the data store, we assume that there are four devices of a particular type connected to a group switch. These devices form part of block X within the system, whose data contains certain information about the four devices. We further assume that the following information must be stored for each of the four devices:

(a) the state of the device;

(b) where the device is connected to the group switch; and (c) the value of a disturbance counter monitoring supervision information about the device.

Thus, the block needs three variables. Referring next to FIG. 4, we can see that rather than identifying a specific location or a specific address within the data store for each device and storing all three variables corresponding to that device at that location, the system organized the data by grouping all the data associated with the state of the four devices in one location, the connection of the four devices in another location, and the disturbance counter of all four devices in the third location. These locations are referred to as variable blocks. The particular data associated with each discrete device is identified within that location.

Figure 5:
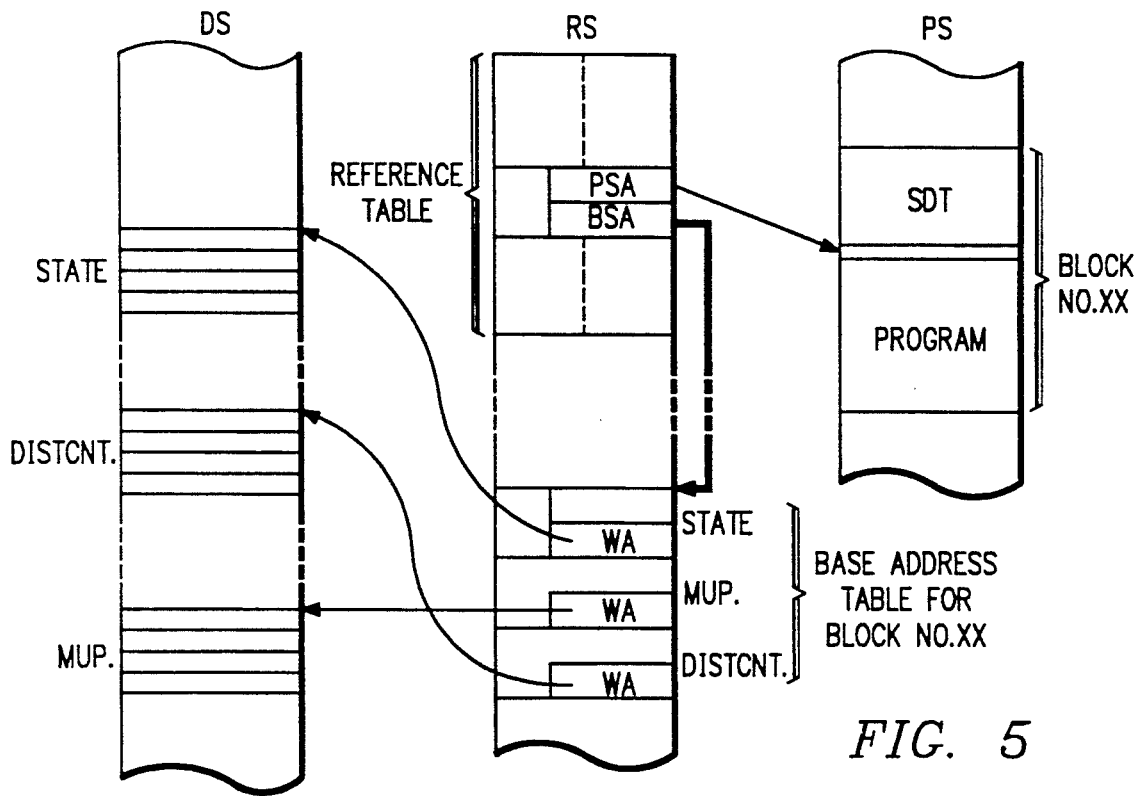
FIG. 5 is a diagrammatic representation of the manner in which various program and data addresses are managed within a modular software system.

The system must perform certain operations in order to locate variables which it may require and it does so by means of additional information stored in the reference store. All the variables of a particular block have a table within the reference store referred to as the base address table. The functions of this table include the storage of information which indicates where in the data store the variables needed by a particular block are located. Each variable within a block is given a number which is used as a pointer within the base address table of the block. The base address table within the reference store is located by means of a word referred to as the base start address (BSA) given in the reference table of the reference store (the same table which contained the program start address for that particular block in the program store). The word that indicates the storage position or start address of the variable block within the data store is referred to as a word address (WA) as illustrated in FIG. 5. Thus, the data for a job within a block is found by locating the base address table for that block (which begins at the base starting address for that block) and then locating the word address within the data store where the data is located.

The software addressing scheme outlined above produces a number of advantages. Among these are the fact that a program can be stored anywhere in the program store without affecting anything except the program start address and the reference store. In addition, a program sequence comprising a job can be placed anywhere in a block without affecting anything except the address in the signal distribution table of that block. In addition, the number of variables for each block is completely flexible and only the size of the base address table associated with that block is affected. Finally, the number of devices can be readily increased or decreased because the variable block can be moved to a vacant area in the data store and only the word address of the data is affected.

Figure 6:
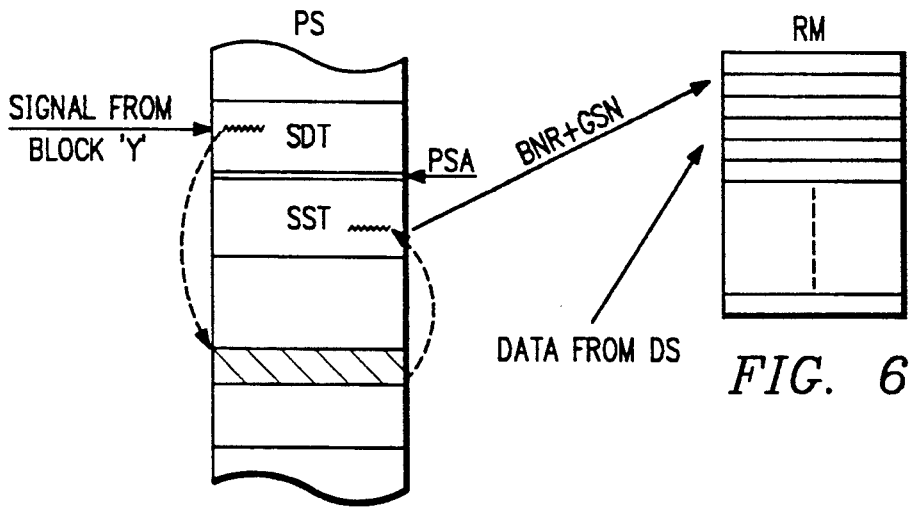
FIG. 6 is a diagrammatic representation of the manner in which software signals are sent from one block of modular software to another block of modular software.

In employing a software addressing system of the type described above, it is frequently necessary to send a signal from one software block to another software block. For example, a supervisory block may require frequent updates on the number of disturbances which occurred within a switch and thus a frequent updating of the value of the disturbance counter of a particular block. The requesting block will request information by sending a software signal to the block from which the information must come. The central processor effects the transfer of such information by sending a software signal from the supervisory block to the block containing the disturbance counters (Block X). The values of the counters are read off and sent back in a software signal to the supervisory block. Before executing the signal transmission, the values are placed in the register memory (RM), located within the central processing unit and used for standard data transfer between the blocks. The global signal number of the signal to the requesting block (Block Y) are stored in block X within the table referred to as the signal sending table (SST). The block number is stored in a register. Referring to FIG. 6, there is shown how a signal from block Y requesting data is referenced to the signal distribution table of the block and hence to the job address within the block which then places a software signal (BNR+GSN) within the signal sending table of that block. That information is sent to the register memory along with the associated requested data from the data store. Then, the register memory contains a software signal and its associated data which has been requested by block Y.

Figure 7:
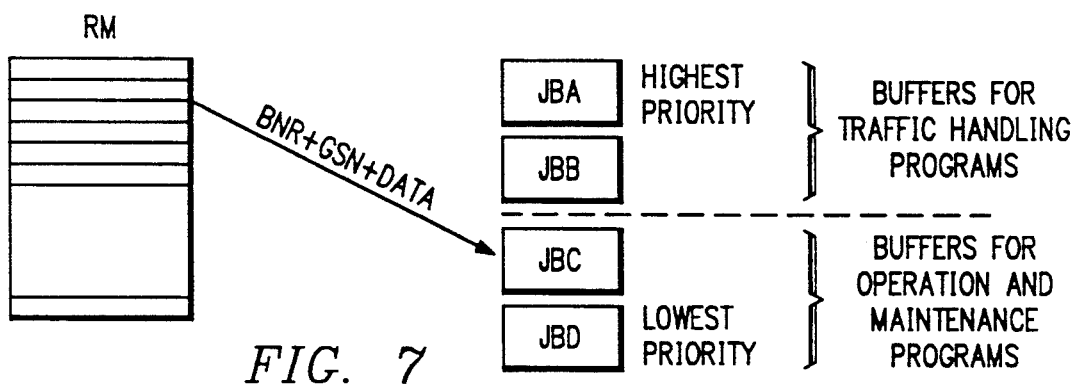
FIG. 7 is a diagrammatic representation of the manner in which software signals temporarily retained in a job buffer of a central processor are handled by the operating system software.

In accordance with the operating system of a program control switching system of the present type, the central processor queues various jobs to be performed and takes them in an orderly sequence in accordance with a priority which has been assigned to the execution of that job. Referring to FIG. 7, there is shown a plurality of job buffers (JBA-JBD) having variable degrees of priority of execution. The buffers for traffic handling programs within the switching system, JBA-JBB, have the highest priority, while buffers associated with operation and maintenance program, JBC-JBD, have the lowest priority. Thus, when the priority of the particular job assigned to the transfer of the data requested by Block Y from the register memory to Block Y occurs, at buffer C, where this job has been assigned, the operating system will execute the transfer and send the software signals, together with the data, from the register memory to block Y, which has requested it.

Figure 8:
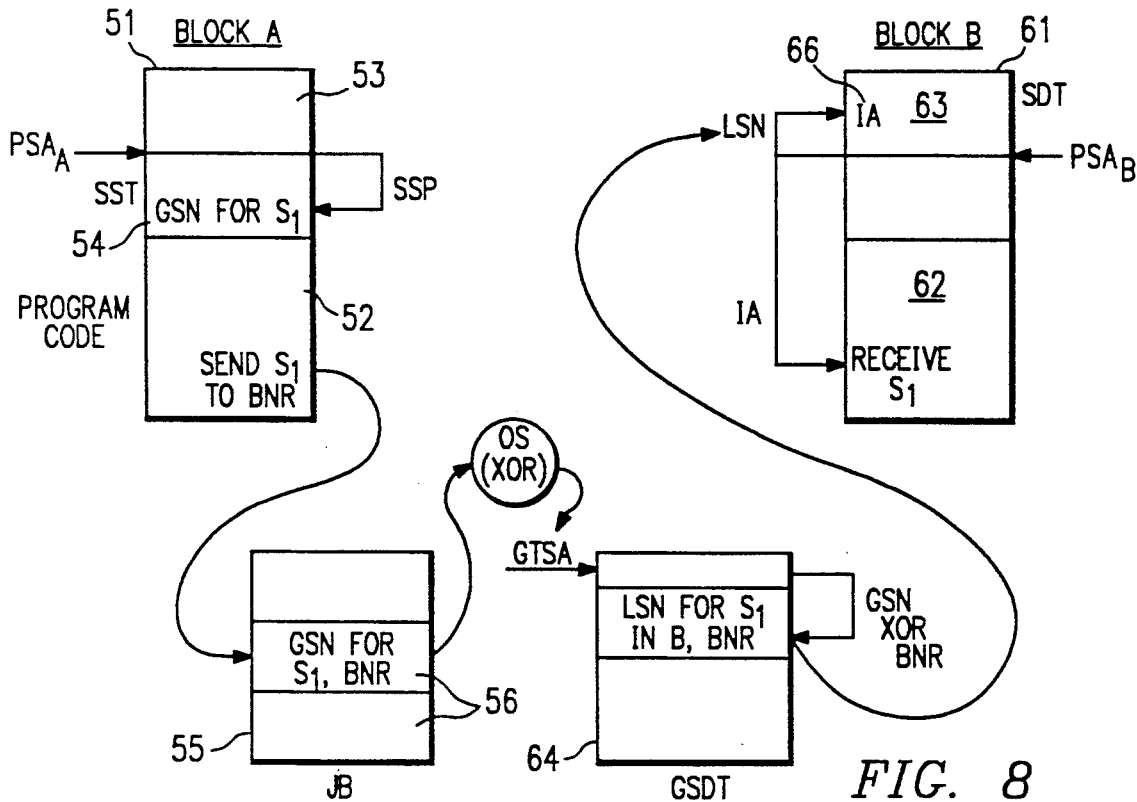
FIG. 8 is a diagrammatic representation of the manner in which modular software blocks are dynamically linked in accordance with the system of the present invention.

Referring now to FIG. 8, there is shown a diagrammatic representation of the transfer of software signal information within a modular software system in accordance with the present invention. A block of modular software 51, referred to as block A, comprises the plurality of sections including program code listing portion 52 a signal, distribution table, 53 and a software signal sending table 54. In addition, a job buffer 55 comprises a plurality of registers 56 within which is temporarily stored software signals awaiting processing by the central processor necessary to forward those signals to a requesting block of software, for example. Another software block, Block B 61, also includes a program cods listing portion 62 and a signal distribution table 63. The represented embodiment of the invention also includes a global signal distribution table 64 within which there is maintained a listing of all of the local signal numbers for the particular signals contained in each block of software loaded in the system.

As discussed briefly above, the global signal distribution table 64 is an essential element of maintaining the linkage addresses among different modules of software. The global signal distribution table 64 maintains the cross-references between the global signal numbers corresponding to particular signals being sent from one module or block to another and the local signal numbers corresponding to each of those signals within each individual block in the system. When a block of software is loaded into the system, the portion of the global signal distribution table 64 corresponding to that block is rewritten to include a local signal number for each signal which is included within the block of software. This is conventionally done by combining the global signal number of that particular signal with the block number of the software block containing that signal through an exclusive-or process or some other technique of combining. Thus, when a software block is removed from the system, modified or enhanced in some way that results in changes to the individual signals within the block, that portion of the software signal distribution table must be rewritten to reflect the new content of signals within the block and a new calculation of local signals numbers for each of those signals within the block.

As shown in FIG. 8, a software signal S1 is being sent from block A 51 to block B 61. Block B 61 is referred to as the receiving block, while block A 51 is referred to as the sending block. The block number of the receiving block is also referred to as the BNR. The system is to send the desired signal S1 to the receiving block and first obtain the global signal number for signal S1 by accessing the signal sending table 54 of block A 51 by means of its address comprising the program start address of block A 51 ($PSA_A$) plus the value of the signal sending pointer (SSP). Once the global signal number for S1 is obtained, it is loaded directly into a register 56 within job buffer 55 and awaits transfer to block B in accordance with the priority protocols of the central processing unit and the priority assigned to the particular signal being transferred. During this time, the information was retained in the form of the global signal number of S1 and the block number of the receiving block. As soon as the signal transfer operation has risen to a sufficient level of priority for the transfer to be executed, the system accesses the global signal distribution table 64 to obtain the local signal number of S1 in block B 61. This is accomplished by entering the global signal distribution table 64 with the address found by taking the global signal number and exclusive-oring that value with the block number BNR. Within this table at that address is found the local signal number for S1 in Block B 61, the receiving block Once the local signal number for S1 in block B 61 is obtained, the system then enters block B 61 by locating the instruction address, IA 66, within block B 61 where the signal should be entered. This is done by obtaining from the signal distribution table 63 of block B 61 by taking the program start address of block B 61, ($PSA_B$) minus the local signal number within block B 61 to read the instruction address 66. Once the instruction address 66 is obtained, the signal S1 is entered into block B 61 and the transfer is complete. Thereafter, the instruction located at the IA 66 begins execution.

The procedure of the system of the present invention includes a number of benefits and advantages over the prior art system of first obtaining the local signal number from the global signal distribution table 64 and entering that value into the job buffer 55. First, after revised software blocks are reloaded into the system, the processing of signals loaded into the job buffer prior to the modification and reloading of the block can still be performed. That is, the information loaded into the job buffer 55 before modifications to the block occurred are still valid after the modification and the job buffer need not be updated or cleared prior to reloading of the block. In addition, when signal entry points have been removed and the revised version of a receiving block, and a signal in the job buffer referring to that point, is processed, the operating system simply detects a missing entry in the global signal distribution table 64 instead of possibly beginning an erroneous execution at an incorrect instruction address within the program. Moreover, signal entry points can be relocated in the revised version of the receiving point and, for a relocated signal, the local signal number and the global signal distribution table 64 will have changed and the global signal distribution table 64 will be updated with this local signal number. When signals to this entry point in the job buffer are processed, the correct local signal number will be obtained from the global signal distribution table 64 by the operating system, thereby eliminating potential errors.

One point must be kept in mind in connection with the application of the system of the present invention and that is that when modifying code affecting a signal entry point in a block, it must be kept in mind that if the data structures are modified, calls of that new or modified code may reach old parameter values, e.g., signal data accompanying the signal in the job buffer that contain addresses and or data in the format of the data structure that was utilized before modification. On the other hand, however, if the block at the time of reloading the newly modified software block has return addresses, the local signal numbers on the return address stack that have been modified as between the old and new versions are updated by the operating system.

Figure 9:
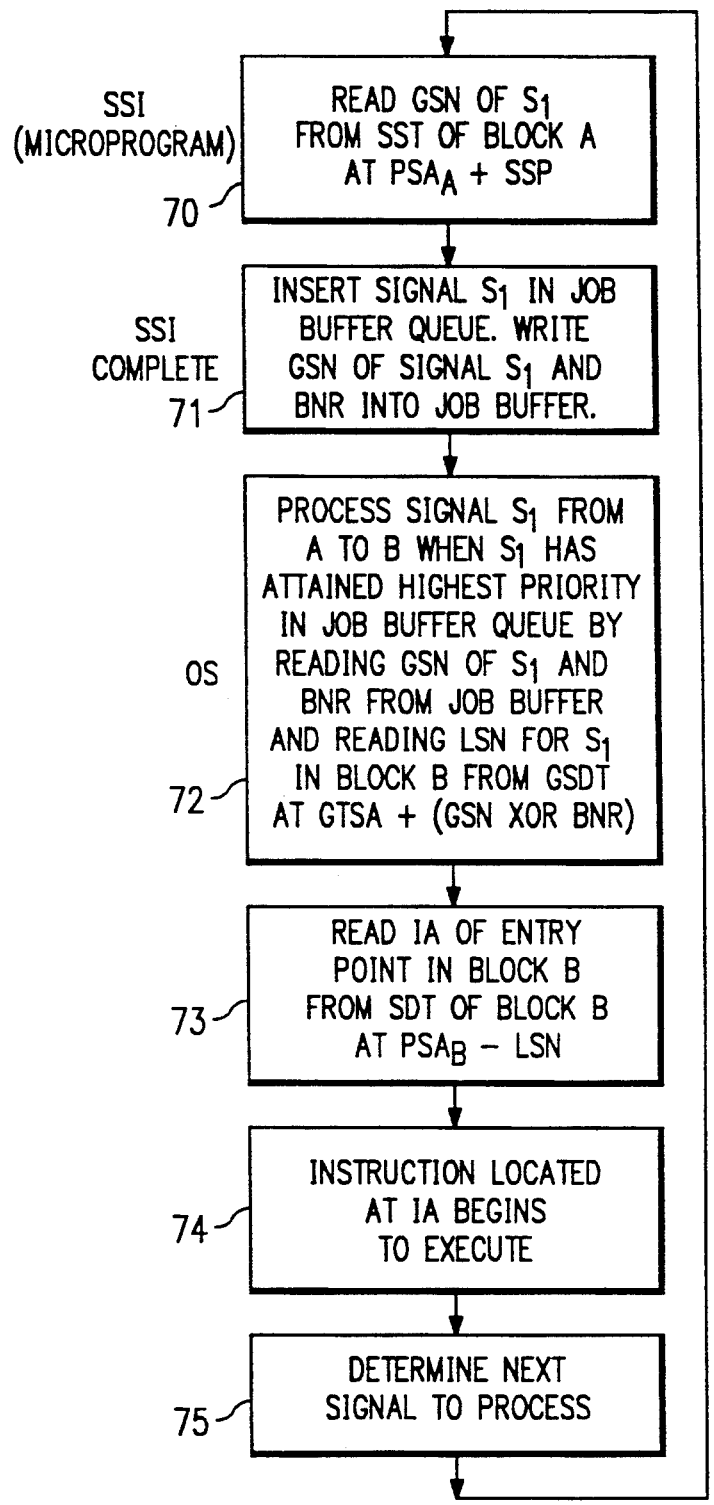
FIG. 9 is a flow chart illustrating the operation of the method and system of the present invention.

As depicted in FIG. 9, a flow chart of the process of the present invention, the Signal Sending Instruction at step 70, a micro-program contained within the central processing unit (cpu) begins the signal transfer process by reading the global signal number of S1 from the SST 54 of Block A 51. The SSI 70 then inserts signals into the queue of the job buffer 55 at step 71, writing the GSN and BNR into the job buffer 55. Next, the operating system 72 processes signal S1 from block A 51 to block B 61 at step 72 by reading the signal's global signal number and BNR from the job buffer 55 and reading its local signal number in block B 61 from the global signal distribution table 64. Next, the IA 66 entry point in block B 61 is read from the SDT 63 of block B 61 at step 73 and the instruction located at that point begins to execute at step 74. The process determines the next signal to process at step 75 that then repeats for other, subsequent signals that require transfer between blocks within the system.

Set forth below is a section of pseudocode which may be used to implement the program logic for loading and maintenance of the GSDT when a revised block is reloaded into the system in accordance with the system of the present invention. It should be clear from this recitation how the actual code would be written to implement and evidence the present invention.

```
if block_name is found_in_symbol_table then begin
   * replace old block with new one; use old BNR *
   assign BNR to_block_name
   for each_entry_point_name do begin
      * handle_definitions *
      if entry_point_name is not found_in_symbol_table then
      begin
         include_entry_point_name_in_symbol_table
         assign_new_GSN_to_entry_point name
         if entry_point_is_unique_in_system then begin
            * add entry in GSDT for unique signals (GSDT-U) *
            write_BNR_and_LSN_in_GSDT-U
         end
         else begin
            * entry point is multiple in system *
            * add entry to the GSDT for multiple signals
              (GSDT-M)*
            calculate_hash-index_(BNR_XOR_GSN)
            search_for_hash-index_in_GSDT-M
            if found then begin
               *collision in GSDT-M at this hash index *
               find_place_in_collision_tab
               write_BNR_and_GSN_in_collision_table
               write_LSN_in_collision_table
            end
            else begin
            * new hash-index in GSDT-M *
            write_BNR_and_GSN_in_GSDT-M
            write_LSN-in_GSDT-M
               end
         end
```

```
        end
    else begin
        * entry point found in symbol table *
        assign_old_GSN_to_entry_point_name
        if entry_point_is_unique_in_system then begin
            * redefinition of unique entry point *
            search_for_index_in_GSDT-U
            rewrite_LSN_in_GSDT-U
        end
        else begin
            * entry point is multiple in system *
            calculate_hash-index_(BNR_XOR_GSN)
            search_for_hash-index_in_GSDT-M
            if found then begin
              find_matching_BNR/GSN_pair
              if found then begin
                  * redefinition of multiple entry point *
                  rewrite_LSN_in_GSDT-M
                    end
                    else begin
                  * add.def. of multiple entry point at same
                    hash-index*
                  find_place_in_collision_tab
                  write_BNR_and_GSN_in_collision_tab
                  write_LSN_in_collision_tab
                    end
            end
            else begin
            * add. def. of multiple entry point at new hash-
            index *
            write_BNR_and_GSN_in_GSDT-M
            write_LSN_in_GSDT-M
                end
        end
    end
    remove_entry_points_from_GSDT_that_no_longer_exists
    for each external reference do begin
        * handle references to defined entry points *
        if corresponding_entry_point_name is not
        found_in_symbol_table then begin
            * unresolved_reference *
            assign_invalid_address_in_SST_that_causes_a_trap
            * character string saved for dynamic loading of
            definition of entry point that later might be
            installed on secondary memory *
            store_character_string_for_unresolved_reference
        end
        else write_GSN_into_corresponding_position_in_SST
        * access of GSDT-U is not performed                    *
        * BNR and LSN are written into GSDT-U when             *
        * handling definitions (see above);                    *
        * access of GSDT-M & coll.tables is not performed      *
        * for multiple entry points because BNR is not         *
        * known until run-time;                                *
        * during run-time, the address-trap in SST can be      *
        * used to start dynamic loading of entry point         *
        * definitions from secondary memory                    *
    end
end * loading of block *
```

© Telefonaktiebolaget LM Ericsson, 1991.

It is thus believed that the operation and construction of the present invention will be apparent from the foregoing discussion. While the method, apparatus and system shown and described has been characterized as being preferred, it would be obvious that various changes and modifications may be made therein without departing from the spirit and scope of the invention as defined by the following claims:

What is claimed is:

1. A method of transferring software signals for communicating information from a first module of modular software for a computer system to a second module of said software residing in said computer system in which a local signal number associated with a particular processing operation to be performed by said software module is stored in a global signal distribution table cross-referencing said local signal number to a global signal number associated with a particular type of software signal within said modules, said global signal distribution table being updated at the time of the loading of said software module, said method comprising:

identifying a software signal to be transferred from said first module to said second module;

transferring a global signal number associated with said software signal along with a block number associated with said second module to a register within a job buffer of a central processing unit running said software;

accessing said global signal distribution table to obtain said local signal number corresponding to said global signal number of said software signal within said second module; and transferring said software signal to the requisite address within said second module associated with said local signal number.

2. A method as set forth in claim 1 wherein said step of accessing said global signal distribution table to obtain said local signal number of said software signal is performed immediately prior to transfer of said signal from said job buffer to said second module.

3. In software for a computer system comprising a plurality of blocks each including a code section, a signal distribution table, and a signal sending table, and in which a software signal for communicating information within said computer system is to be transferred from a first block to a location identified by a local address within a second block through a job buffer of a central processing unit running said software, the method of:

linking said local address of said software signal in said second block to said software signal immediately prior to transfer of said software signal from said job buffer to said second block and following the loading of said software signal into said job buffer from said first block.

4. The method according to claim 3 wherein said transfer of said software signal from said job buffer to said second block comprises the steps of:

accessing a global signal number of said software signal and a number associated with said second block from said job buffer;

accessing within a global signal distribution table a local signal number of said software signal within said second block;

determining an instruction address entry point for said software signal in said second block; and initiating execution at said instruction address in said second block.

5. The method according to claim 3 wherein said loading of said software signal into said job buffer is performed by accessing a global signal number and a number associated with said software signal from said signal sending table and writing said global signal number and a number associated with said second block into said job buffer.

6. A computer in which information is transferred from one location to another using software signals including global signal numbers indicative of types of signals and local signal numbers associated with partial processing operations within a software module, said computer having a central processor, a reference store, a program store, a data store, a register memory, a job buffer, an operating system and a global signal distribution table, said computer including software and comprising:

means for dividing the functions of said computer software into function blocks, each said function block having a program store location and a base start address;

means for storing the program store location and the associated base start address of said function blocks within said reference store;

means for initiating jobs within said function blocks, said jobs being initiated in sequence based upon a queued order within said job buffer and using said program store position and said base start address stored in said reference store;

means for generating and storing global signal numbers for software signals contained within said function blocks, each of said global signal numbers being associated with a particular type of software signal; and means for referencing local signal numbers associated with said software signals which are indicative of particular operations to be performed by software within each of said function blocks and which correspond to said global signal numbers.

7. The computer of claim 6 wherein said means for initiating jobs comprises:

means for generating a signal sending instruction for said software signal being processed;

means for processing said software signal from a sending block to a receiving block;

means for reading the instruction address from a signal distribution table within said receiving block; and means for executing said job located at said instruction address in said receiving block.

8. The computer of claim 7 wherein said means for generating a signal sending instruction comprises:

means for determining a global signal number for said software signal; and means for writing said global signal number and a block number associated with said receiving block into said job buffer.

9. The computer of claim 8 wherein said means for processing said software signal comprises:

means for reading said global signal number of said software signal and said block number of said receiving block; and means for reading said local signal number for said software signal from a global signal distribution table.

10. The computer of claim 6 wherein said means for referencing local signal numbers further comprises:

means for storing in a relocatable manner said local signal numbers for said software signals in all said function blocks; and means for combining said global signal numbers with a global table start address in order to locate a stored value for said local signal number in any one of said function blocks receiving said software signal.

11. A system for use within a computer system for transferring software signals for communicating information from a first module of a modular software system to a second module of said software residing in said computer system in which a local signal number associated with a particular processing operation to be performed by said software module is stored in a global signal distribution table cross-referencing said local signal number to a global signal number associated with a particular type of software signal within said modules, said global signal distribution table being updated at the time of the loading of said software module, said system comprising:

means for identifying a software signal to be transferred from said first module to said second module;

means for transferring a global signal number associated with said software signal along with a block number associated with said second module to a register within a job buffer of a central processing unit running said software system;

means for accessing said global signal distribution table to obtain said local signal number corresponding to said global signal number of said software signal within said second module; and means for transferring said software signal to the requisite address within said second module associated with said local signal number.

12. A system for a computer as set forth in claim 11 wherein said means for accessing said global signal distribution table to obtain said local signal number of said software signal is performed immediately prior to the transfer of said signal from said job buffer to said second module.

13. A software system for a computer having a plurality of blocks, each including a code section, a signal distribution table, and a signal sending table, and in which a software signal for communicating information within said computer system is to be transferred from a first block to a location identified by a local address within a second block through a job buffer of a central processing unit running said software, said system comprising:

means for linking said local address of said software signal in said second block to said software signal immediately prior to the transfer of said software signal from said job buffer to said second block and following the loading of said software signal into said job buffer from said first block.

14. The system for a computer according to claim 13 wherein said transfer of said software signal from said job buffer to said second block comprises:

means for accessing a global signal number of said software signal and a number associated with said second block from said job buffer;

means for accessing a local signal number of said software signal within said second block;

means for determining an instruction address entry point for said software signal in said second block; and means for initiating execution at said instruction address in said second block.

15. The system for a computer according to claim 13 wherein said loading of said software signal into said job buffer is performed by accessing a global signal number and a number associated with said software signal from said signal sending table and writing said global signal number and a number associated with said second block into said job buffer.

* * * * *

UNITED STATES PATENT AND TRADEMARK OFFICE
CERTIFICATE OF CORRECTION

PATENT NO. : 5,297,285
DATED : March 22, 1994
INVENTOR(S) : Anders Abrahamsson and Lars Holmqvist It is certified that error appears in the above-indentified patent and that said Letters Patent is hereby corrected as shown below:

```
In the Abstract, Line 16:  After "tasks", insert --within--
Column 1, Line 41:  Delete "problem"; insert --problems--
Column 4, Line 44:  Delete "ana"; insert --and--
Column 4, Line 61:  Delete "storage-memory";
                             insert --storage memory--
Column 6, Line 44:  Delete "block-"; insert --block.--
Column 7, Line 11:  Delete "block-"; insert --block.--
Column 7, Line 60:  Delete "52 a signal,";
                             insert --52, a signal--
Column 7, Line 67:  Delete "cods"; insert --code--
Column 14, Line 6:  Delete "partial"; insert --particular--
```

Signed and Sealed this

Sixth Day of September, 1994

Attest:

BRUCE LEHMAN

*Attesting Officer*         *Commissioner of Patents and Trademarks*